United States Patent
Guo et al.

(10) Patent No.: US 11,447,258 B2
(45) Date of Patent: Sep. 20, 2022

(54) MOTOR AND UNMANNED AERIAL VEHICLE

(71) Applicant: SZ DJI TECHNOLOGY CO., LTD., Shenzhen (CN)

(72) Inventors: Xiaokai Guo, Shenzhen (CN); Canlong Lin, Shenzhen (CN); Di Ou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 517 days.

(21) Appl. No.: 16/405,507

(22) Filed: May 7, 2019

(65) Prior Publication Data
US 2020/0346770 A1 Nov. 5, 2020

Related U.S. Application Data

(63) Continuation of application No. PCT/CN2016/111917, filed on Dec. 24, 2016.

(30) Foreign Application Priority Data

Nov. 8, 2016 (CN) .......................... 201621205905.3

(51) Int. Cl.
*B64D 27/26* (2006.01)
*B64C 27/08* (2006.01)
*B64C 27/14* (2006.01)
*B64D 27/24* (2006.01)

(52) U.S. Cl.
CPC .............. *B64D 27/26* (2013.01); *B64C 27/08* (2013.01); *B64C 27/14* (2013.01); *B64D 27/24* (2013.01); *B64C 2201/024* (2013.01); *B64C 2201/042* (2013.01); *B64C 2201/108* (2013.01)

(58) Field of Classification Search
CPC ........ B64C 2201/024; B64C 2201/042; B64C 2201/108; B64C 27/08; B64C 27/14; B64C 29/00; B64C 29/02; B64C 39/024; B64D 27/24; B64D 27/26; Y02T 50/60
See application file for complete search history.

(56) References Cited

U.S. PATENT DOCUMENTS

| 4,037,807 A * | 7/1977 | Johnston ................. B64C 29/02 244/7 B |
| 8,931,730 B2 * | 1/2015 | Wang ...................... B64C 25/32 244/17.17 |
| 9,126,693 B1 * | 9/2015 | Shi .......................... G05B 11/42 |
| 9,242,714 B2 * | 1/2016 | Wang ..................... B64C 39/024 |
| 9,260,184 B2 * | 2/2016 | Olm ........................ B64C 27/08 |
| 9,623,969 B2 * | 4/2017 | Nelson .................. B64C 39/024 |

(Continued)

FOREIGN PATENT DOCUMENTS

| CN | 103359282 A | 10/2013 |
| CN | 103381885 A | 11/2013 |

(Continued)

OTHER PUBLICATIONS

World Intellectual Property Organization (WIPO) International Search Report for PCT/CN2016/111917 dated Aug. 10, 2017 6 Pages.

*Primary Examiner* — Medhat Badawi
(74) *Attorney, Agent, or Firm* — Anova Law Group, PLLC

(57) ABSTRACT

A motor includes a bottom and a top opposite to the bottom. The bottom is a mounting side of the motor and the bottom is inclined relative to a rotation axis of the motor.

19 Claims, 6 Drawing Sheets

(56) References Cited

U.S. PATENT DOCUMENTS

| | | | | |
|---|---|---|---|---|
| 10,676,187 B2* | 6/2020 | Bernhardt | B64C 3/56 | |
| 2002/0125367 A1* | 9/2002 | Killingsworth | B60F 5/00 | |
| | | | | 244/17.11 |
| 2002/0195518 A1* | 12/2002 | Killingsworth | B63H 7/02 | |
| | | | | 244/7 A |
| 2005/0236520 A1* | 10/2005 | Wukowitz | B64C 9/02 | |
| | | | | 244/105 |
| 2006/0016930 A1* | 1/2006 | Pak | B64D 35/04 | |
| | | | | 244/12.4 |
| 2008/0048065 A1* | 2/2008 | Kuntz | B64C 39/024 | |
| | | | | 244/17.23 |
| 2011/0226892 A1* | 9/2011 | Crowther | B64C 15/02 | |
| | | | | 244/17.23 |
| 2012/0083945 A1* | 4/2012 | Oakley | B64C 25/52 | |
| | | | | 701/2 |
| 2013/0026304 A1* | 1/2013 | Wang | B64C 29/0033 | |
| | | | | 244/7 R |
| 2013/0146716 A1* | 6/2013 | Gettinger | B64C 5/12 | |
| | | | | 244/215 |
| 2014/0061376 A1* | 3/2014 | Fisher | B60K 7/0007 | |
| | | | | 244/62 |
| 2014/0117149 A1* | 5/2014 | Zhou | A63H 27/12 | |
| | | | | 244/17.23 |
| 2015/0321755 A1* | 11/2015 | Martin | B64C 39/024 | |
| | | | | 244/17.23 |
| 2016/0023755 A1* | 1/2016 | Elshafei | G08G 5/025 | |
| | | | | 244/17.13 |
| 2016/0107751 A1* | 4/2016 | D'Andrea | B64C 27/08 | |
| | | | | 701/4 |
| 2016/0114887 A1* | 4/2016 | Zhou | H04N 5/23238 | |
| | | | | 348/148 |
| 2016/0144954 A1* | 5/2016 | Daigle | B64C 39/024 | |
| | | | | 244/17.23 |
| 2016/0176520 A1* | 6/2016 | Goldstein | B64C 39/024 | |
| | | | | 244/17.17 |
| 2017/0297707 A1* | 10/2017 | Rollefstad | G05D 1/0005 | |
| 2017/0313418 A1* | 11/2017 | Yoon | B64C 27/20 | |
| 2018/0002003 A1* | 1/2018 | Won | B64C 27/26 | |
| 2018/0029703 A1* | 2/2018 | Simon | B64C 29/0025 | |
| 2018/0118322 A1* | 5/2018 | Harris | B64C 39/024 | |

FOREIGN PATENT DOCUMENTS

| | | |
|---|---|---|
| CN | 104369859 A | 2/2015 |
| CN | 204776039 U | 11/2015 |
| CN | 105292453 A | 2/2016 |
| CN | 206155785 U | 5/2017 |

* cited by examiner

MOTOR AND UNMANNED AERIAL VEHICLE

CROSS-REFERENCE TO RELATED APPLICATIONS

This application is a continuation of International Application No. PCT/CN2016/111917, filed on Dec. 24, 2016, which claims priority to Chinese Application No. 201621205905.3, filed on Nov. 8, 2016, the entire contents of both of which are incorporated herein by reference.

TECHNICAL FIELD

The present disclosure relates to unmanned aerial vehicle (UAV) technology and, more particularly, to a motor and a UAV having the same.

BACKGROUND

Currently, unmanned aerial vehicles (UAVs) are driven by multiple independent motors. For example, a four-rotor UAV includes four propellers that are driven by four independent motors, respectively. The UAV achieves a static hover under the thrust produced by the rotation of the multiple propellers and changes an altitude within a short time period in the static hover state, thereby achieving a high mobility and an effective load carrying capacity.

In conventional technologies, the rotation of the UAV is dependent on a change of a yaw angle of the UAV that is driven by a differential anti-torque produced by the rotation of the multiple propellers. Due to the limited magnitude and response of a force generated by the differential anti-torque, a driving force of the yaw angle is relatively weak when the UAV have a relatively large inertia. As such, a response speed of the UAV is slow during the rotation. Due to the inability to response quickly, a relatively long time is needed to adjust the balance of the UAV when an external disturbance (e.g., wind) occurs. Thus, the ability to resist disturbance is also weak.

SUMMARY

In accordance with the disclosure, there is provided a motor including a bottom and a top opposite to the bottom. The bottom is a mounting side of the motor and the bottom is inclined relative to a rotation axis of the motor.

Also in accordance with the disclosure, there is provided an unmanned aerial vehicle (UAV) including a fuselage, an arm arranged at the fuselage, a motor arranged at the arm, and a propeller arranged at the motor. The motor includes a bottom and a top opposite to the bottom. The bottom is a mounting side of the motor and the bottom is inclined relative to a rotation axis of the motor. The propeller is perpendicular to the rotation axis of the motor, such that the propeller is inclined relative to the bottom of the motor.

DETAILED DESCRIPTION OF THE EMBODIMENTS

Example embodiments of the present disclosure will be described with reference to the accompanying drawings, in which the same numbers refer to the same or similar elements unless otherwise specified. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As described herein, the terms used in the specification of the present disclosure are intended to describe example embodiments, instead of limiting the present disclosure. The singular forms "a," "an," and "the" used in the specification and the claims of the present disclosure are intended to include the plural forms unless otherwise specified. The term "and/or" used herein includes any suitable combination or all combination of one or more related items listed.

The terms "first," "second," "third," or the like, used in the disclosure are intended to describe various information, instead of limiting the information. The terms are merely intended for distinguishing the same type of information. For example, without departing from the scope of the disclosure, first information may be referred to as second information, and similarly, the second information may be referred to as the first information. As used herein, the word "if" may have the same meaning as "when," "while," or "in response to," according to the context.

Example embodiments will be described with reference to the accompanying drawings. In the situation where the technical solutions described in the embodiments are not conflicting, they can be combined.

Figure 1:
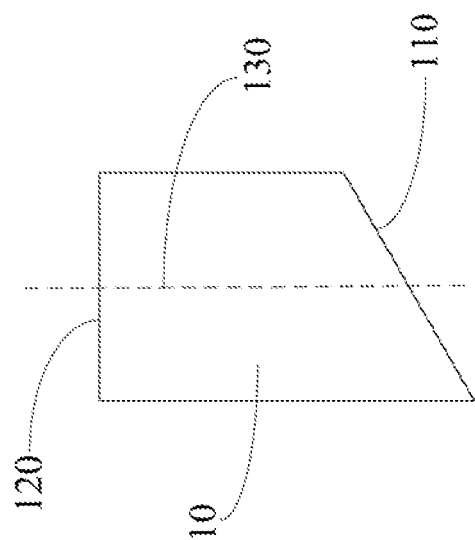
FIG. 1 is a structural diagram of a motor according to an embodiment of the disclosure.

FIG. 1 is a structural diagram of a motor 10 consistent with the disclosure. As shown in FIG. 1, the motor 10 includes a bottom 110 and a top 120 opposite to the bottom 110. The bottom 110 is a mounting side of the motor 10 and the bottom 110 is inclined relative to a rotation axis 130 of the motor 10.

Figure 2:
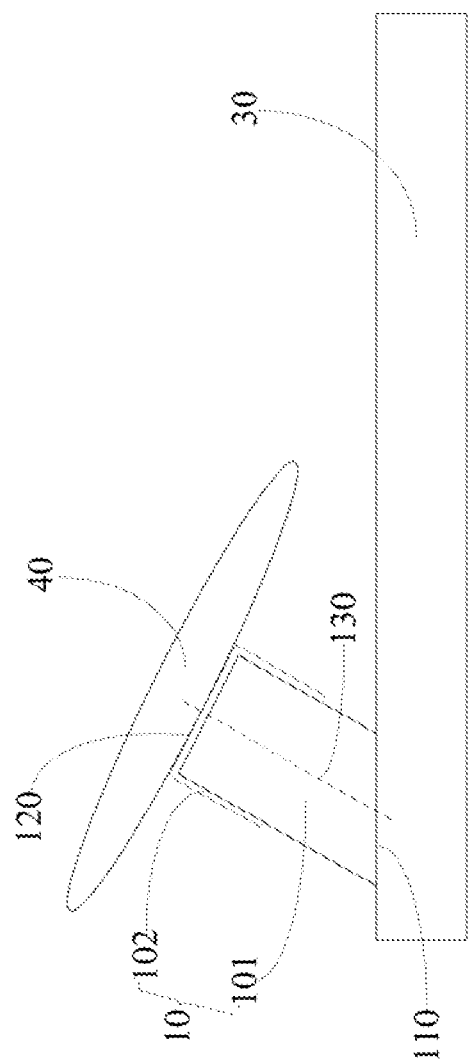
FIG. 2 is a structural diagram of the motor in FIG. 1 in an application scenario.

FIG. 2 is a structural diagram of the motor 10 in an application scenario consistent with the disclosure. As shown in FIG. 2, the motor 10 is an external rotor motor in this application scenario. The motor 10 includes a stator 101 and an external rotor 102 arranged outside the stator 101, and the external rotor 102 can rotate relative to the stator 101. The bottom 110 of the motor 10 is a bottom of the stator 101, and the top 120 of the motor 10 is a top of the external rotor 102. The top 120 is perpendicular to the rotation axis 130 of the motor 10 and is configured to connect a second object 40 that needs to be rotated by the motor 10. In practical applications, the bottom 110 of the motor 10 can be fixedly connected to a first object 30 (e.g., an arm of an aircraft), and the second object 40 (e.g., a propeller) can be fixedly connected to the top 120 of the motor 10, such that the second object 40 can be inclined relative to the first object 30 and the external rotor 102 can rotate relative to the stator 101 and drive the second object 40 to rotate together.

Figure 3:
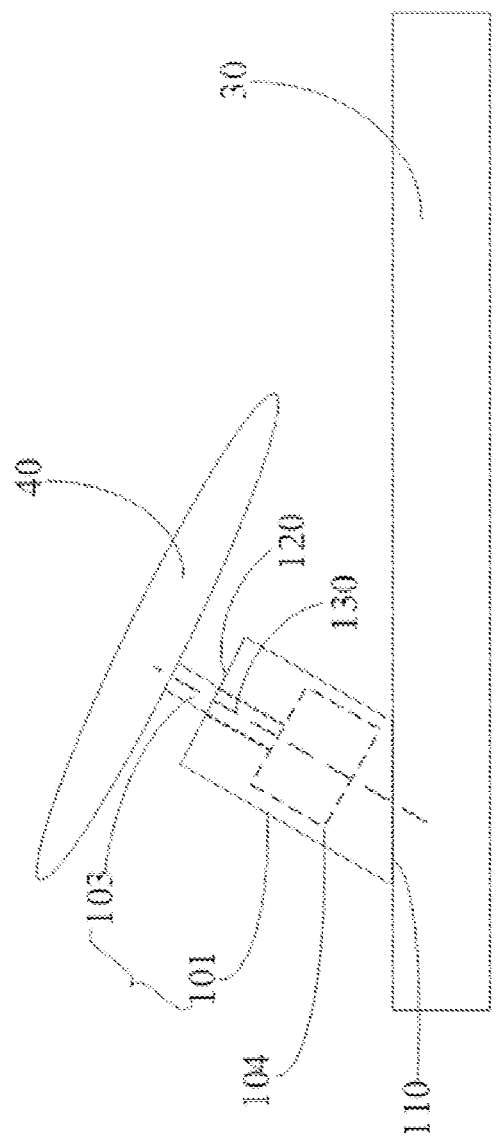
FIG. 3 is a structural diagram of the motor in FIG. 1 in another application scenario.

FIG. 3 is a structural diagram of the motor 10 in another application scenario consistent with the disclosure. As shown in FIG. 3, the motor 10 is an internal rotor motor in this application scenario. The motor 10 includes the stator 101, an internal rotor 104 arranged inside the stator 101, and a drive shaft 103 connected to the internal rotor 104. The internal rotor 104 can rotate relative to the stator 101, and the drive shaft 103 partially protrudes from the stator 101. The bottom 110 of the motor 10 is the bottom of the stator 101, and the top 120 of the motor 10 is the top of the stator 101. The drive shaft 103 partially protrudes from the top 120 and is configured to connect the second object 40 that needs to be rotated by the motor 10. In practical applications, the bottom 110 of the motor 10 can be fixedly connected to the first object 30 (e.g., an arm of an aircraft), and the second object 40 (e.g., a propeller) can be fixedly connected to a portion of the drive shaft 103 that protrudes from the top 120, and hence the second object 40 can be inclined relative to the first object 30. When the internal rotor 104 rotates relative to the stator 101, the drive shaft 103 can drive the second object 40 to rotate together.

In some embodiments, the motor 10 can also include a housing. The housing can include a first portion arranged at a side of the bottom 110, a second portion arranged at a side of the top 120, and a bent portion between the first portion and the second portion. The first portion can be perpendicular to the bottom 110, and the second portion can be perpendicular to the top 120, such that the motor 10 can be applied to more application environments. In some embodiments, the housing can be one-piece molded.

In some embodiments, the bottom 110 can be inclined at a first preset angle with respect to a first axis parallel to the top 120. The bottom 110 can be inclined at a second preset angle with respect to a second axis parallel to the top 120. The first axis is perpendicular to the second axis. The first preset angle and the second preset angle can be the same or different. In some embodiments, a range of the first preset angle can be greater than 0° and less than 10°. In some embodiments, a range of the second preset angle can be greater than 0° and less than 10°. In some embodiments, both the range of the first preset angle and the range of the second preset angle can be greater than 0° and less than 10°.

Figure 4:
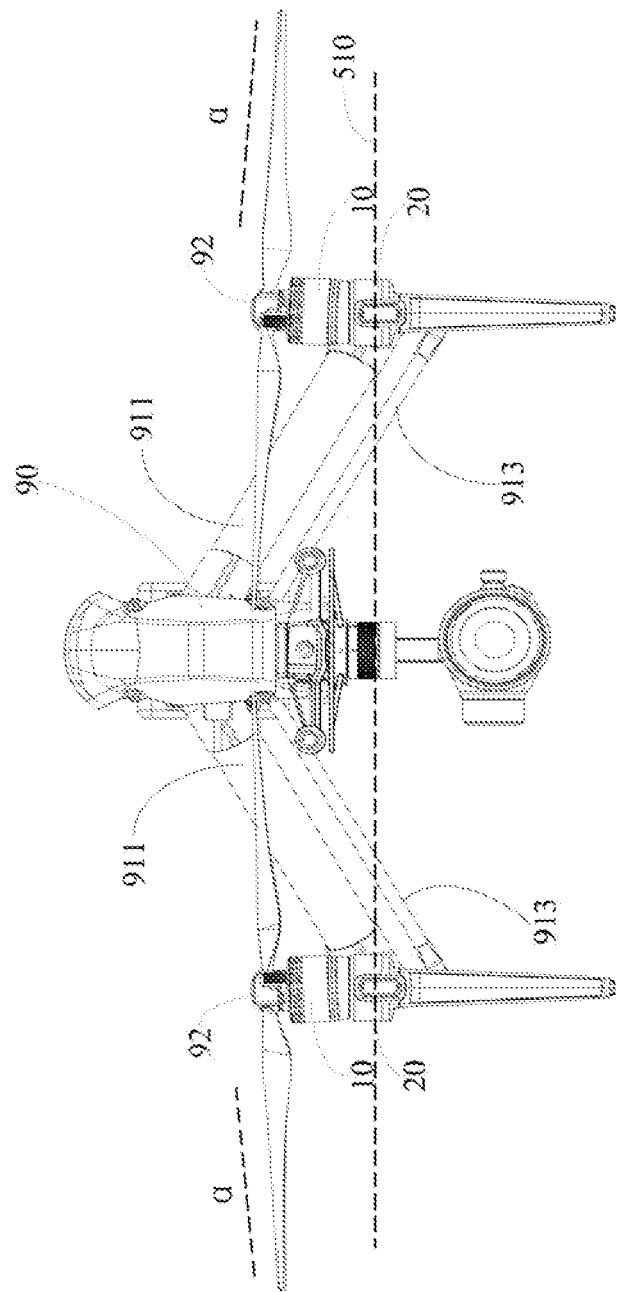
FIG. 4 is a front view of an unmanned aerial vehicle (UAV) according to an embodiment of the disclosure.
Figure 5:
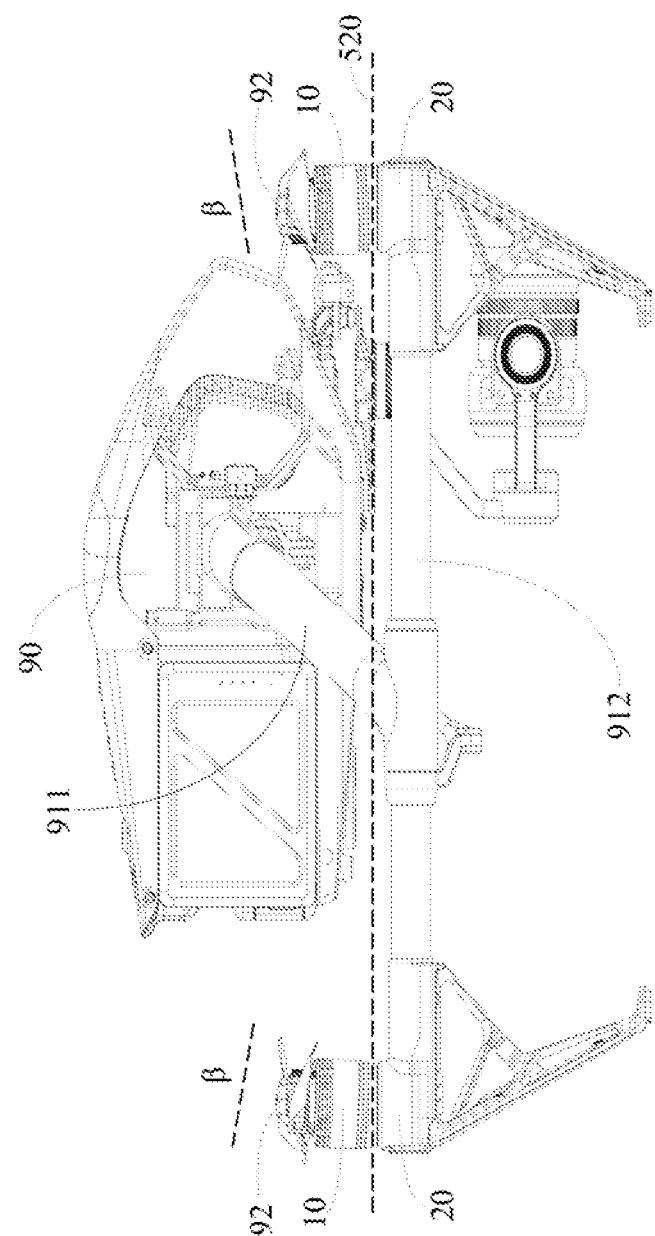
FIG. 5 is a left view of the UAV in FIG. 4.

FIG. 4 is a front view of an unmanned aerial vehicle (UAV) 1 consistent with the disclosure. FIG. 5 is a left view of the UAV 1. As shown in FIGS. 4 and 5, the UAV includes a fuselage 90, an arm arranged at the fuselage 90, a propeller 92, and the motor 10. The motor 10 is arranged at the arm and the propeller 92 is arranged at the motor 10. The propeller 92 is perpendicular to the rotation axis 130 of the motor 10, such that the propeller 92 can be inclined relative to the bottom 110 of the motor 10. In some embodiments, the motor 10 of the UAV 1 can be similar to the motor 10 shown in FIGS. 1 to 3. In some embodiments, the arm can have a bar-shape or a cylinder-shape structure. The bottom 110 of the motor 10 can be arranged parallel to an axis of the arm. In some other embodiments, the arm can have an arc-shape structure. It is not intended to limit the structure of the arm here.

Figure 6:
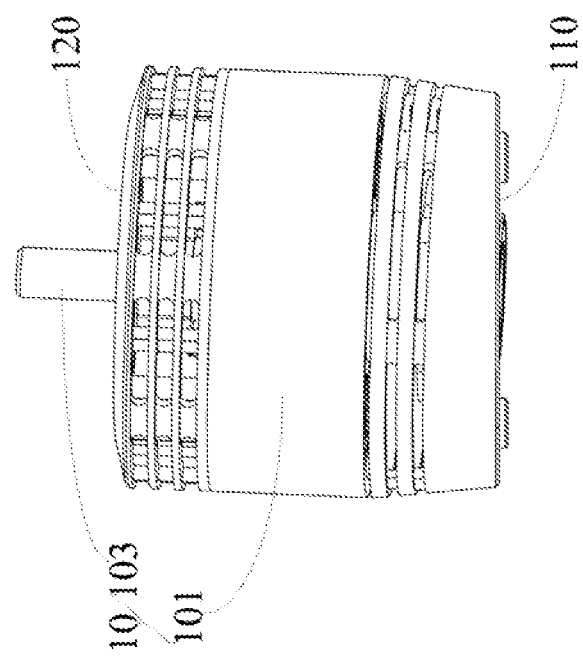
FIG. 6 is a structural diagram of a motor applied to the UAV in FIG. 4 according to an embodiment of the disclosure.

FIG. 6 is a structural diagram of the motor 10 applied to the UAV 1 consistent with the disclosure. As shown in FIGS. 4 to 6, the motor 10 is an internal rotor motor. The motor 10 includes the stator 101, an internal rotor (not shown in FIG. 6) arranged inside the stator 101, and the drive shaft 103 connected to the internal rotor. The internal rotor can rotate relative to the stator 101. The drive shaft 103 partially protrudes from the top 120 and is configured to connect to the propeller 92 of the UAV 1 and drive the propeller 92 to rotate together.

As shown in FIGS. 4 and 5, in some embodiments, after the propeller 92 and the motor 10 are installed at the arm, a propeller disk formed by the rotation of the propeller 92 is inclined at a first inclination angle α with respect to a pitch axis 510 of the UAV 1. The propeller disk formed by the rotation of the propeller 92 is inclined at a second inclination angle β with respect to a roll axis 520 of the UAV 1. In some embodiments, the first inclination angle α and the second inclination angle β can be the same or different. In some embodiments, a range of the first inclination angle can be greater than 0° and less than 10°. In some embodiments, a range of the second inclination angle can be greater than 0° and less than 10°. In some embodiments, both the range of the first inclination angle and the range of the second inclination angle can be greater than 0° and less than 10°. In some embodiments, the first inclination angle can be about 3°. In some embodiments, the second inclination angle can be about 2°. In some embodiments, the first inclination angle can be about 3° and the second inclination angle can be about 2°. With such a configuration, the UAV 1 can have force components of a lift force of the propeller 92 in different anti-torque directions, such that the anti-torque force can be enhanced to ensure that the UAV 1 can gain sufficient driving force when steering and the control of the yaw angle can be more accurate. When the UAV 1 is tilted leftward or rightward along a roll axis, or is tilted forward or backward along a pitch axis, or has an ascent or descent attitude change, a greater lateral force can be obtained to improve the response speed during the rotation, thereby improving the lateral wind resistance and steering flexibility of the UAV.

As shown in FIGS. 4 and 5, in some embodiments, the UAV 1 has two arms arranged separately at two sides of the fuselage 90. The propellers 92 are arranged on the arms via corresponding motors 10.

In some embodiments, each arm includes a first support arm 911, a second support arm 912, and a third support arm 913. An end of the first support arm 911 is connected to the fuselage 90. Another end of the first support arm 911 is connected to a middle portion of the second support arm 912. The propellers 92 and the motors 10 are arranged on the second support arm 912. In some embodiments, two propellers 92 and two motors 10 are arranged at two free ends of the second support arm 912. One of the free ends at the front side of the UAV 1 is also referred to as a "front free end" and the other one of the free ends at the rear side of the UAV 1 is also referred to as a "rear free end." The two motors 10 arranged at the same second support arm 912 are inclinedly arranged facing and closing to each other, and are arranged mirror-symmetrically with respect to a center line of the fuselage 90. As shown in FIG. 5, the two motors 10 arranged at the same second support arm 912 are facing and closing to each other and are inclined inwardly with respect to the fuselage 90 in directions close to the fuselage 90, respectively. In other words, the two motors 10 arranged at the same second support arm 912 are inclined toward each other, i.e., a distance between tops of such two motors 10 is smaller than a distance between bottoms of such two motors 10. The two motors 10 arranged at the free ends of a same side, such as the front side or the rear side, of different second support arms 912 are inclinedly arranged opposite to and away from each other, and are arranged mirror-symmetrically with respect to the center line of the fuselage 90. As shown in FIG. 4, the two motors 10 arranged at the free ends of the same side of different second support arms 912 are opposite to and away from each other, and are inclined outwardly with respect to the fuselage 90 in directions away from the fuselage 90, respectively. In other words, the two motors 10 arranged at the free ends of a same side of different second support arms 912 are inclined away from each other, i.e., a distance between tops of such two motors 10 is larger than a distance between bottoms of such two motors 10. In some embodiments, the first support arm 911 can be inclinedly connected to the fuselage 90. The second support arm 912 can be arranged parallel to the roll axis 520 of the UAV 1. The first support arm 911 and the second support arm 912 can form a T-shape structure. In some embodiments, the two motors 10 arranged at the free ends of the same side of different second support arms 912 can be arranged parallel to the pitch axis 510 of the UAV 1. In some other embodiments, the arm can be one-piece molded.

In some embodiments, a motor base 20 is arranged at the second support arm 912 of the arm. The motor base 20 can be coaxially arranged with respect to the second arm 912 of the arm. The motor 10 can be mounted on the motor base 20 to enhance the stability of the motor 10.

In some embodiments, the UAV 1 can be a multi-rotating-wing UAV, such as a quad-rotating-wing UAV, a hexa-rotating-wing UAV, an octo-rotating-wing UAV, or another UAV having even or odd number of rotating wings. Each rotating wing (i.e., the propeller) can be mounted on the arm via the motor 10.

According to the disclosed UAV 1, after the propeller 92 is installed at the second support arm 912 of the arm via the motor 10, the propeller 92 is perpendicular to the rotation axis 130 of the motor 10, such that the propeller 92 can be inclined with respect to the bottom 110 of the motor 10. Further, after the propeller 92 is installed at the second support arm 912 of the arm via the motor 10, the propeller disk formed by the rotation of the propeller 92 is inclined at the first inclination angle with respect to the pitch axis 510 of the UAV 1. The propeller disk formed by the rotation of the propeller 92 is inclined at the second inclination angle with respect to the roll axis 520 of the UAV 1. In this situation, the UAV 1 can obtain the force component of the lift force of the propeller 92 in the anti-torque direction, such that the anti-torque force can be enhanced. A rotation thrust generated by the component force is quite large for the UAV 1 to ensure to ensure that the UAV 1 can gain sufficient driving force when steering and the control of the yaw angle can be more accurate. When the UAV 1 is tilted leftward or rightward along the roll axis, or is tilted forward or backward along the pitch axis, or has the ascent or descent attitude change, a greater lateral force can be obtained to improve the response speed during the rotation, thereby improving the lateral wind resistance and steering flexibility of the UAV.

It is intended that the specification and examples be considered as example only and not to limit the scope of the disclosure. Those skilled in the art will be appreciated that any modification or equivalents to the disclosed embodiments are intended to be encompassed within the scope of the present disclosure.

What is claimed is:

1. A motor for driving a propeller of an unmanned aerial vehicle (UAV), comprising:
    a bottom that is a mounting side of the motor mounting the motor to an arm of the UAV, a rotation axis of the propeller is coaxial with a rotation axis of the motor, and an included angle between the rotation axis of the propeller and the arm of the UAV is a fixed angle; and
    a top opposite to the bottom and perpendicular to the rotation axis of the motor and perpendicular to the rotation axis of the propeller, wherein a propeller disk formed by rotation of the propeller is inclined at a first inclination angle with respect to a pitch axis of the UAV, and is inclined at a second inclination angle with respect to a roll axis of the UAV;
    wherein:
    the propeller is one of four propellers of the UAV;
    the motor is one of four motors of the UAV that drive the four propellers, respectively;
    the four motors include a first motor, a second motor, a third motor, and a fourth motor; and
    the four propellers include a first propeller coupled with the first motor, a second propeller coupled with the second motor, a third propeller coupled with the third motor, and a fourth propeller coupled with the fourth motor;
    the first motor and the second motor are arranged at a first side of a fuselage of the UAV, the third motor and the fourth motor are arranged at a second side of the fuselage opposite to the first side, the first motor and the second motor at the first side are inclined toward each other, and the third motor and the fourth motor at the second side are inclined toward each other; and
    the first motor and the third motor are arranged close to a front of the fuselage, the second motor and the fourth motor are arranged close to a rear of the fuselage, the first motor and the third motor close to the front are inclined away from each other, and the second motor and the fourth motor close to the rear are inclined away from each other.

2. The motor of claim 1, wherein:
    the motor is an external rotor motor; or
    the motor is an internal rotor motor including a drive shaft protruding from the top.

3. The motor of claim 1, wherein:
    the top is inclined at a first preset angle with respect to a first axis parallel to the bottom;
    the top is inclined at a second preset angle with respect to a second axis parallel to the bottom; and
    the first axis is perpendicular to the second axis.

4. The motor of claim 3, wherein a value of the first preset angle is not equal to a value of the second preset angle.

5. The motor of claim 3, wherein at least one of the first preset angle or the second preset angle is in a range greater than 0° and less than 10°.

6. An unmanned aerial vehicle (UAV) comprising:
    a fuselage;
    an arm arranged at the fuselage;
    a motor including:
        a bottom mounting the motor to the arm; and
        a top opposite to the bottom and perpendicular to the rotation axis of the motor; and
    a propeller arranged at the motor and perpendicular to the rotation axis of the motor, wherein a rotation axis of the propeller is coaxial with a rotation axis of the motor, the rotation axis of the propeller is perpendicular to the top, an included angle between the rotation axis of the propeller and the arm of the UAV is a fixed angle, and a propeller disk formed by rotation of the propeller is inclined at a first inclination angle with respect to a pitch axis of the UAV, and is inclined at a second inclination angle with respect to a roll axis of the UAV;
    wherein:
    the propeller is one of four propellers of the UAV;
    the motor is one of four motors of the UAV that drive the four propellers, respectively;
    the four motors include a first motor, a second motor, a third motor, and a fourth motor; and the four propellers include a first propeller coupled with the first motor, a second propeller coupled with the second motor, a third propeller coupled with the third motor, and a fourth propeller coupled with the fourth motor;

the first motor and the second motor are arranged at a first side of a fuselage of the UAV, the third motor and the fourth motor are arranged at a second side of the fuselage opposite to the first side, the first motor and the second motor at the first side are inclined toward each other, and the third motor and the fourth motor at the second side are inclined toward each other; and the first motor and the third motor are arranged close to a front of the fuselage, the second motor and the fourth motor are arranged close to a rear of the fuselage, the first motor and the third motor close to the front are inclined away from each other, and the second motor and the fourth motor close to the rear are inclined away from each other.

7. The UAV of claim 6, wherein the bottom of the motor is parallel to an axis of the arm.

8. The UAV of claim 6,
wherein the arm is a first arm of a plurality of arms arranged at the fuselage;
the plurality of arms further include:
 a second arm;
 wherein the first arm and the second arm are arranged at two sides of the fuselage, respectively.

9. The UAV of claim 8, wherein each of the first arm and the second arm includes:
a first support arm including a first end and a second end opposite to the first end, the first end of the first support arm connecting to the fuselage; and
a second support arm, the second end of the first support arm connecting to a middle portion of the second support arm.

10. The UAV of claim 9, wherein the second support arm is parallel to the roll axis of the UAV.

11. The UAV of claim 9, wherein:
the second support arm of the first arm has a first front free end and a first rear free end, and the second support arm of the second arm has a second front free end and a second rear free end; and
each of the propellers and each of the motors are arranged at one of the first front free end, the first rear free end, the second front free end, and the second rear free end.

12. The UAV of claim 11, wherein the two motors arranged at the first front free end and the second front free end or the two motors arranged at the first rear free end and the second rear free end are arranged parallel to the pitch axis of the UAV.

13. The UAV of claim 6, wherein:
at least one of the first inclination angle or the second inclination angle is in a range greater than 0° and less than 10°.

14. The UAV of claim 13, wherein:
the first inclination angle is about 3°;
the second inclination angle is about 2°.

15. The UAV of claim 6, further comprising:
a motor base arranged at and coaxial with the arm;
wherein the motor is mounted at the motor base.

16. The UAV of claim 6, wherein the UAV is a multi-rotating-wing UAV.

17. The UAV of claim 6, wherein:
the motor is an external rotor motor; and
the top is perpendicular to the rotation axis of the motor.

18. The UAV of claim 6, wherein:
a value of the first inclination angle is not equal to a value of the second inclination angle.

19. The motor of claim 1, wherein:
the bottom is inclined relative to the rotation axis of the motor and inclined relative to the rotation axis of the propeller; and
the top is inclined relative to the bottom.

\* \* \* \* \*